UNITED STATES PATENT OFFICE 2,159,008

SATURATED POLYCARBOXYLIC ACID ESTERS OF 2-CHLOROALLYL ALCOHOL

Gerald H. Coleman and Bartholdt C. Hadler, Midland, Mich., assignors to The Dow Chemical Company, Midland, Mich., a corporation of Michigan No Drawing. Application March 14, 1938, Serial No. 195,852

6 Claims. (Cl. 260—485)

This invention concerns the esters of 2-chloroallyl alcohol with saturated polycarboxylic acids. All such esters are new compounds useful as intermediates in the preparation of other organic compounds and as modifying agents in the polymerization of vinyl compounds, particularly styrene. They vary in physical characteristics from crystalline solids to high-boiling liquids and are soluble in a number of organic solvents, e. g., acetone, petroleum ether, etc.

The term "saturated polycarboxylic acid" as herein employed will be understood to include oxalic acid and acids having the general formula $$R—(COOH)_n$$

wherein R represents an aromatic, aliphatic, or cycloaliphatic hydrocarbon radical containing no ethylenic linkages, and $n$ represents an integer. Examples of such acids are malonic acid, succinic acid, adipic acid, phthalic acid, methylsuccinic acid, tricarballylic acid, naphthalene-1.2-dicarboxylic acid, hexahydrophthalic acid, cyclopentane dicarboxylic acid, etc.

The new esters may be prepared by esterifying 2-chloroallyl alcohol with one of the acids hereinbefore defined. The esterification is preferably carried out by heating a mixture of 2-chloroallyl alcohol and approximately one chemical equivalent of the polycarboxylic acid at a temperature of approximately 50°–120° C. It is also preferable to employ a small proportion, e. g., approximately 0.01–0.04 molecular equivalent of a strong acid, such as sulphuric or benzene sulphonic acid, as a catalyst for the esterification. Water is formed in the reaction and, if desired, a water-immiscible organic solvent, such as benzene, toluene, methylene chloride, etc., may be added for the purpose of promoting the vaporization and removal of the water in the form of an azeotropic mixture with the solvent. Upon completion of the reaction, the reacted mixture is treated with sufficient alkali to neutralize the acid contained therein, after which the ester product is separated by fractional distillation under reduced pressure, or by other appropriate procedure.

The following examples will illustrate a number of ways in which the principle of our invention has been employed but are not to be construed as limiting the same:

Example 1

A mixture of 63.0 grams (0.5 mole) of oxalic acid dihydrate and 92.5 grams (1.0 mole) of 2-chloroallyl alcohol was heated at 82°–100° C. for 4.25 hours in a flask fitted with dropping funnel, condenser, and receiver arranged in such manner as to permit distillation of water from the mixture. During the heating benzene was added drop-wise to facilitate the distillation of water. The reacted mixture was cooled, washed with a 5 per cent aqueous sodium bicarbonate solution and water, and the benzene removed by distillation. The ester product was decolorized with charcoal and, after crystallization from petroleum ether, was obtained as a white crystalline solid having a melting point of approximately 54.5°–55.5° C. It has the formula:

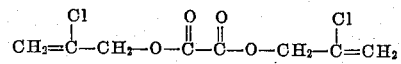

Example 2

A mixture of 118.0 grams (1.0 mole) of succinic acid and 231.0 grams (2.5 moles) of 2-chloroallyl alcohol was heated at 50°–56° C. for 24 hours. During the heating methylene chloride was added drop-wise to facilitate the distillation of water from the mixture. The reacted mixture was washed with dilute aqueous sodium bicarbonate solution and water. Methylene chloride was removed by distillation and the ester product fractionally distilled under vacuum. There was obtained 203 grams (73.7 per cent of the theoretical yield) of di-(2-chloroallyl) succinate, a pale yellow, slightly viscous liquid distilling at 142°–145° C. under 4 millimeters pressure, having a specific gravity of 1.261 at 20/4° C., and an index of refraction, $$n_D^{20}=1.4820$$

Di-(2-chloroallyl) succinate has the formula:

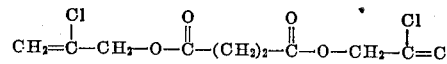

Example 3

A mixture of 73.0 grams (0.5 mole) of adipic acid, 92.5 grams (1.0 mole) of 2-chloroallyl alcohol, and 5 grams of benzene sulphonic acid was heated at 83°–96° C. for 3 hours, during which time benzene was added as in Example 1. Upon completion of the reaction, the reacted mixture was washed with dilute sodium carbonate solution and the ester product separated as in Example 2. There was obtained 92 grams (62 per cent of the theoretical yield) of di-(2-chloroallyl-) adipate, a pale yellow liquid distilling at 173°–175° C. under 4 millimeters pressure, having a specific gravity of 1.193 at 20/4° C., and having an index of refraction, $$n_D^{20}=1.4769$$

Di-(2-chloroallyl) adipate has the formula:

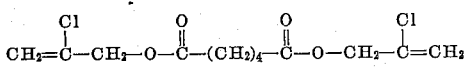

*Example 4*

A mixture of 83.0 grams (0.5 mole) of phthalic acid, 92.5 grams (1.0 mole) of 2-chloroallyl alcohol, and 5 grams of benzene sulphonic acid was heated at approximately 80°–90° C. for 20 hours as in Example 2. The reacted mixture was washed and distilled as in Example 2, and the ester product was recovered as a light yellow liquid, distilling at 176°–178° C. under 2 millimeters pressure, having a specific gravity of 1.288 at 20/4° C., and having an index of refraction, $$n_D^{20}=1.5373$$

Di-(2-chloroallyl-) phthalate has the formula:

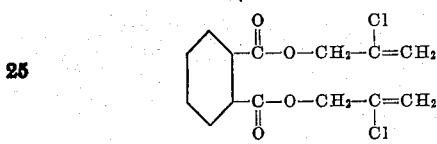

Other esters of the present class may be prepared by reacting 2-chloroallyl alcohol with an acid of the type hereinbefore defined. For example, 2-chloroallyl alcohol may be reacted with sym.-dimethylsuccinic acid to produce di-(2-chloroallyl) sym.-dimethylsuccinate; with pimelic acid to produce di-(2-chloroallyl) pimelate; with sebacic acid to produce di-(2-chloroallyl) sebacate; with tricarballylic acid to produce the tri-(2-chloroallyl) ester of tricarballylic acid; with trimesic acid to produce the tri-(2-chloroallyl) ester of trimesic acid; with naphthalene-1.2-dicarboxylic acid to produce the di-(2-chloroallyl) ester of naphthalene-1.2-dicarboxylic acid; etc.

Other modes of applying the principle of our invention may be employed instead of those explained, change being made as regards the materials employed, provided the ingredients stated by any of the following claims or the equivalent of such stated ingredients be employed.

We therefore particularly point out and distinctly claim as our invention:

1. A 2-chloroallyl ester of an acid selected from the class consisting of oxalic acid and acids having the general formula:

wherein R represents a hydrocarbon radical of the class consisting of aromatic, aliphatic, and cycloaliphatic radicals containing no ethylenic linkages, and $n$ represents an integer.

2. An ester of 2-chloroallyl alcohol having the general formula:

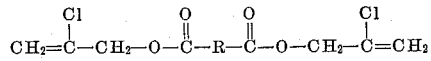

wherein R represents a hydrocarbon radical of the class consisting of aromatic, aliphatic and cycloaliphatic radicals containing no ethylenic linkages.

3. An ester of 2-chloroallyl alcohol having the general formula:

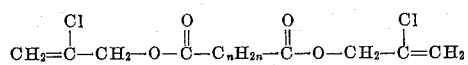

wherein $n$ represents an integer.

4. Di-(2-chloroallyl-) oxalate, a white crystalline solid having a melting point of approximately 54.5°–55.5° C., and having the formula:

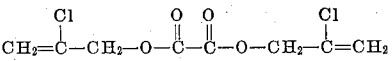

5. Di-(2-chloroallyl-) succinate, a liquid distilling at approximately 142°–145° C. under 4 millimeters pressure, and having a specific gravity of 1.261 at 20/4° C. and the formula:

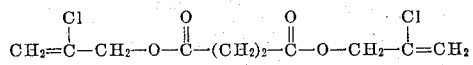

6. Di-(2-chloroallyl-) adipate, a liquid distilling at approximately 173°–175° C. under 4 millimeters pressure, and having a specific gravity of 1.193 at 20/4° C. and the formula:

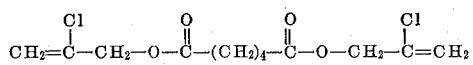

GERALD H. COLEMAN.
BARTHOLDT C. HADLER.